US012145251B2

(12) United States Patent
Yuan et al.

(10) Patent No.: US 12,145,251 B2
(45) Date of Patent: Nov. 19, 2024

(54) CONNECTOR FOR COUPLING ATTACHMENT TO POWER TOOL

(71) Applicant: TECHTRONIC CORDLESS GP, Anderson, SC (US)

(72) Inventors: Li Wang Yuan, Dongguan (CN); Jing Yao Chen, Dongguan (CN); Yi Mai, Dongguan (CN); Song Long, Dongguan (CN)

(73) Assignee: Techtronic Cordless GP, Anderson, SC (US)

( * ) Notice: Subject to any disclaimer, the term of this patent is extended or adjusted under 35 U.S.C. 154(b) by 836 days.

(21) Appl. No.: 17/311,486

(22) PCT Filed: Dec. 11, 2018

(86) PCT No.: PCT/CN2018/120202

§ 371 (c)(1),
(2) Date: Jun. 7, 2021

(87) PCT Pub. No.: WO2020/118504

PCT Pub. Date: Jun. 18, 2020

(65) Prior Publication Data

US 2022/0024020 A1 Jan. 27, 2022

(51) Int. Cl.
*B25F 5/02* (2006.01)
*B25B 23/04* (2006.01)

(52) U.S. Cl.
CPC .............. *B25F 5/02* (2013.01); *B25B 23/045* (2013.01)

(58) Field of Classification Search
None
See application file for complete search history.

(56) References Cited

U.S. PATENT DOCUMENTS

| | | | | |
|---|---|---|---|---|
| 5,101,697 A * | 4/1992 | Fishback | B25B 23/045 81/433 |
| 5,662,011 A * | 9/1997 | Habermehl | B25B 21/007 81/57.37 |
| 7,134,367 B2 * | 11/2006 | Gehring | B25B 23/045 81/57.37 |

(Continued)

FOREIGN PATENT DOCUMENTS

| | | |
|---|---|---|
| CN | 2071098 U | 2/1991 |
| CN | 1724211 A | 1/2006 |

(Continued)

OTHER PUBLICATIONS

Extended European Search Report for Application No. 18943206.5 dated Jul. 6, 2022 (8 pages).

(Continued)

*Primary Examiner* — Jonathan P Masinick
(74) *Attorney, Agent, or Firm* — Michael Best & Friedrich LLP

(57) ABSTRACT

The power tool comprises a first power tool portion having a rotatable collar and a first locking member arranged to be actuated by the rotatable collar and a second power tool portion having a second locking member. The rotatable collar is rotatable about an axis for actuating the first locking member to removably engage the first locking member with the second locking member, thereby releasably locking the first power tool portion with the second power tool portion along the axis.

18 Claims, 9 Drawing Sheets

(56) References Cited

U.S. PATENT DOCUMENTS

| | | | | |
|---|---|---|---|---|
| 7,293,944 | B2 | 11/2007 | Lui | |
| 8,011,444 | B2 * | 9/2011 | Pyles | B23Q 5/20<br>173/171 |
| 9,067,293 | B2 * | 6/2015 | Bernardi | B24B 23/022 |
| 9,193,045 | B2 * | 11/2015 | Saur | B25B 21/00 |
| 11,273,541 | B2 * | 3/2022 | Clark | B25B 21/002 |
| 12,030,168 | B2 * | 7/2024 | Yue | B25F 5/001 |
| 2004/0055769 | A1 | 3/2004 | Chou | |
| 2010/0252292 | A1 | 10/2010 | Pyles et al. | |
| 2012/0074658 | A1 * | 3/2012 | Puzio | B23B 31/1079<br>279/134 |
| 2013/0093149 | A1 | 4/2013 | Saur et al. | |
| 2018/0345475 | A1 * | 12/2018 | Qian | B25F 5/02 |

FOREIGN PATENT DOCUMENTS

| | | | |
|---|---|---|---|
| CN | 102378660 | A | 3/2012 |
| CN | 104136168 | A | 11/2014 |
| CN | 205057974 | U | 3/2016 |
| CN | 205904965 | U | 1/2017 |
| EP | 2789426 | A1 | 10/2014 |

OTHER PUBLICATIONS

International Search Report and Written Opinion for Application No. PCT/CN2018/120202 dated Jun. 4, 2019 (10 pages).

* cited by examiner

CONNECTOR FOR COUPLING ATTACHMENT TO POWER TOOL

CROSS-REFERENCE TO RELATED APPLICATIONS

This application is a national phase filing under 35 U.S.C. § 371 of International Application No. PCT/CN2018/120202, filed Dec. 11, 2018, the entire content of which is incorporated herein by reference.

FIELD OF INVENTION

This invention relates to power tools and particularly, although not exclusively, to power screw guns with a connector for coupling an attachment or a magazine to the body of the screw gun.

BACKGROUND OF INVENTION

Conventional manual screw guns that work with one single screw at a time are quickly being replaced with automatic power screw guns that drive a series of fasteners from a collated strip. Such automatic power screw guns typically have a screw gun body, with an attachment to provide a collated strip of fasteners. The attachment is usually mated with the screw gun body through a connector fixedly attached to one end of the screw gun body, and where the connecting interfaces of the screw gun body and the attachment have corresponding structures for connection.

One problem with the existing connectors is that one needs to use some tools in order to dismount or mount the attachment from or to the screw gun body manually. This is very inefficient and time consuming. In some cases where the tools are lacked, the user may not be able to carry out his work, since he cannot mount or dismount the attachment to the screw gun body.

Another problem is that such mounting and dismounting require the user to move his or her hands from their normal operating positions to a carry out such operations. Even in cases where a latch is used for the mounting and dismounting of attachment, the user would still need to move one hand to the connector, and the other hand to pull the attachment out from the screw gun body.

SUMMARY OF INVENTION

It is therefore desirable to solve the abovementioned problems to enable a more efficient and convenient way to mount and dismount attachments to and from the screw gun body.

In the light of the foregoing background, it is an object to address the above needs, to overcome or substantially ameliorate the above disadvantages or, more generally, to provide a power tool with a connector for connecting an attachment to a screw gun body.

The above object is met by the combination of features of the main claims; the dependent claims disclose further advantageous embodiments of the invention.

One skilled in the art will derive from the following description other objects of the invention. Therefore, the foregoing statements of object are not exhaustive and serve merely to illustrate some of the many objects of the present invention.

Accordingly, the present invention, in one aspect is a power tool comprises a first power tool portion having a rotatable collar and a first locking member arranged to be actuated by the rotatable collar, a second power tool portion having a second locking member, wherein the rotatable collar is rotatable about an axis for actuating the first locking member to removably engage the first locking member with the second locking member, thereby releasably locking the first power tool portion with the second power tool portion along the axis, wherein the first power tool portion further comprises a groove on an inner surface of the rotatable collar, a stop member movable parallel to the axis between an extended position and a retracted position and a biasing member biasing the stop member to the extended position; wherein at the extended position, the stop member is engaged with the groove of the rotatable collar such that rotation of the first locking member is obstructed and wherein at the retracted position, the stop member is not engaged with the groove of the rotatable collar such that rotation of the first locking member is unobstructed.

Preferably, the second locking member comprises an axial projection for moving the stop member from the extended position to the retracted position as the first power tool portion is moved along the axis to couple with the second power tool portion.

Additionally, the first power tool portion further comprises a torsion spring connected with the rotatable collar such that upon the stop member is being moved from the extended position to the retracted position, the rotatable collar is being rotated under a force of the torsion spring.

Preferably, the stop member extends at least partly into the first locking member at the extended position.

Preferably, the first locking member is arranged around the second locking member when the first power tool portion locks with the second power tool portion.

More preferably, the first locking member and the second locking member are arranged to form a bayonet coupling.

Preferably, the rotatable collar has an inner surface and an outer surface, and the first locking member is in contact with the inner surface.

Preferably, the first locking member is rotatable, and the rotatable collar is rotatable about the axis for rotating the first locking member.

More preferably, the first locking member and the rotatable collar are connected for synchronous rotation.

Preferably, the first locking member and the second locking member are generally annular.

In a second embodiment, the present invention is a power tool, comprising: a first power tool portion having a rotatable collar and a first locking member arranged to be actuated by the rotatable collar; a second power tool portion having a second locking member; wherein the rotatable collar is rotatable about an axis for actuating the first locking member to removably engage the first locking member with the second locking member, thereby releasably locking the first power tool portion with the second power tool portion along the axis; wherein the first locking member and the second locking member are arranged to form an interference fit when the first power tool portion is locked with the second power tool portion along the axis.

Preferably, the first locking member comprises a reversibly, radially-movable portion movable between a first radial position further away from the axis and a second radial position closer to the axis for engagement with the second locking member.

More preferably, the reversibly, radially-movable portion is arranged inside of the rotatable collar.

Preferably, the rotatable collar has an inner surface and an outer surface, wherein the inner surface is threaded.

Preferably, the reversibly, radially-movable portion includes a ramp surface along the axial direction such that one side is closer to the inner surface of the rotatable collar and the other side is further away from the inner surface of the rotatable collar.

Additionally, the first power tool portion further includes an intermediate member having a threaded outer surface, wherein the threaded outer surface is arranged to threadedly engage with the inner surface of the rotatable collar.

Most preferably, the intermediate member is movable along the axis on the ramp surface between an unlocked position in which the radially-movable portion is at the first radial position and a locked position in which the radially-movable portion is radially-compressed at the second radial positon.

Preferably, the rotatable collar is rotatable about the axis for moving the intermediate member between the unlocked position and the locked position.

In a third embodiment, the present invention is a power tool, comprising: a first coupling part and a second coupling part rotatably coupled with each other, for rotating relative to each other about a rotation axis; and one or more biasing members, biased radially outwardly with respect to the rotation axis and arranged between the first and second coupling parts, for limiting relative rotation of the first and second coupling parts.

Preferably, each of the biasing members comprises circumferentially-extending leg portions and, in between, a projection-ramp portion that projects radially outwardly.

Preferably, the first coupling part comprises inner and outer circumferential walls that define a circumferential space therebetween and the second coupling part comprises a circumferential projection at least partly received in the circumferential space such that the first coupling part at least partly surrounds the second coupling part.

More preferably, the biasing member is arranged radially between the inner circumferential wall of the first coupling part and the circumferential projection of the second coupling part.

More preferably, the circumferential projection of the second coupling part includes a radially-inner-circumferential face directly facing the inner circumferential wall; the radially-inner-circumferential face includes a plurality of angularly-spaced radial-grooves for receiving the projection-ramp portion.

Most preferably, the projection-ramp portion of the biasing member is arranged to slide-and-move-along the angularly-spaced radial-grooves when the first and second coupling parts are rotated relative to each other.

Preferably, the power tool further comprises an axial-locking mechanism for axially locking the first and second coupling parts.

More preferably, the circumferential projection of the second coupling part comprises a radially-outer-circumferential face, and wherein the axial-locking mechanism comprises a groove formed on the radially-outer-circumferential face, a radial opening formed on the outer circumferential wall and a locking member arranged to be received in the groove and the radial opening.

Most preferably, the groove extends around the entire radially-outer-circumferential face.

Preferably, the locking member comprises a roller.

Additionally, the power tool further comprises a collar sleeve non-rotatably coupled with and arranged around the radially-outer-circumferential face of the first coupling part, for radially retaining the locking member in the groove and radial opening.

Preferably, the one or more biasing members comprise two diametrically opposed biasing members.

More preferably, the one or more biasing members are rotationally fixed to the first coupling part.

Most preferably, the one or more biasing members are a leaf spring.

In another aspect, the present invention is a power tool portion, which comprises a rotatable collar and a locking member arranged to be actuated by the rotatable collar, wherein the rotatable collar is rotatable about an axis for actuating the locking member to removably engage the locking member with a second locking member of a second power tool portion, thereby releasably locking the power tool portion with the second power tool portion along the axis, wherein the power tool portion further comprises: a groove on an inner surface of the rotatable collar, a stop member movable parallel to the axis between an extended position and a retracted position and a biasing member biasing the stop member to the extended position wherein at the extended position, the stop member is engaged with the groove of the rotatable collar such that rotation of the locking member is obstructed and wherein at the retracted position, the stop member is not engaged with the groove of the rotatable collar such that rotation of the first locking member is unobstructed.

Preferably, the stop member is arranged to move from the extended position to the retracted position by an axial projection of the second locking member as the power tool portion is moved along the axis to couple with the second power tool portion.

Additionally, the power tool portion further comprises a torsion spring connected with the rotatable collar such that upon the stop member is being moved from the extended position to the retracted position, the rotatable collar is being rotated under a force of the torsion spring.

Preferably, the stop member extends at least partly into the locking member at the extended position.

Preferably, the locking member is arranged around the second locking member when the power tool portion locks with the second power tool portion.

More preferably, the locking member and the second locking member are arranged to form a bayonet coupling.

Preferably, the rotatable collar has an inner surface and an outer surface, and the locking member is in contact with the inner surface Preferably, the locking member is rotatable and the rotatable collar is rotatable about the axis for rotating the locking member.

More preferably, the locking member and the rotatable collar are connected for synchronous rotation Preferably, the locking member and the second locking member are generally annular.

In yet another embodiment, the present invention is a power tool portion, which comprises a rotatable collar and a locking member arranged to be actuated by the rotatable collar, a second power tool portion having a second locking member, wherein the rotatable collar is rotatable about an axis for actuating the locking member to removably engage the locking member with a second locking member of a second power tool portion, thereby releasably locking the power tool portion with the second power tool portion along the axis, wherein the locking member and the second locking member are arranged to form an interference fit when the power tool portion is locked with the second power tool portion along the axis.

Preferably, the locking member comprises a reversibly, radially-movable portion movable between a first radial position further away from the axis and a second radial position closer to the axis for engagement with the second locking member.

More preferably, the reversibly, radially-movable portion is arrange inside of the rotatable collar.

Preferably, the rotatable collar has an inner surface and an outer surface, wherein the inner surface is threaded.

Preferably, the reversibly, radially-movable portion includes a ramp surface along the axial direction such that one side is closer to the inner surface of the rotatable collar and the other side is further away from the inner surface of the rotatable collar.

Additionally, the power tool portion further includes an intermediate member having a threaded outer surface, wherein the threaded surface is arranged to threadedly engage with the inner surface of the rotatable collar.

Most preferably, the intermediate member is movable along the axis on the ramp surface between an unlocked position in which the radially-movable portion is at the first radial position and a locked position in which the radially-movable portion is radially-compressed at the second radial positon.

Preferably, the rotatable collar is rotatable about the axis for moving the intermediate member between the unlocked position and the locked position.

Other aspects of the invention will become apparent by consideration of the detailed description and accompanying drawings.

The present invention therefore provides various configurations of an attachment connector for a screw gun. By utilising a rotatable connector, the present invention provides a more efficient and convenient way to mount and dismount attachments to and from the screw gun body.

BRIEF DESCRIPTION OF FIGURES

The foregoing and further features of the present invention will now be described, by way of example, with reference to the accompanying drawings in which.

DETAILED DESCRIPTION OF THE PREFERRED EMBODIMENTS

Figure 1A:
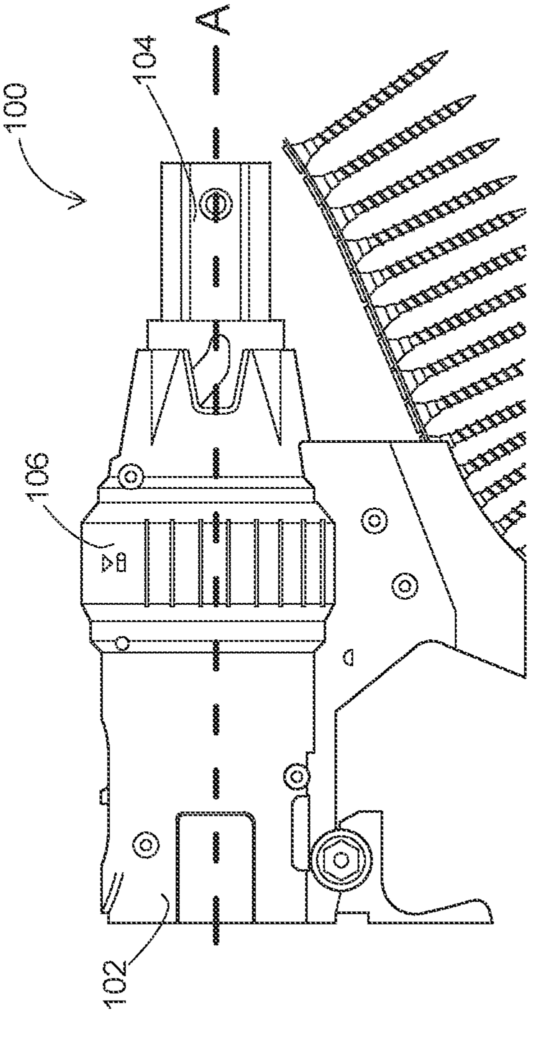
FIG. 1A shows a perspective view of a portion of a power tool with a first power tool portion attached to a second power tool portion through a rotatable collar according to a first embodiment of the invention.
Figure 1B:
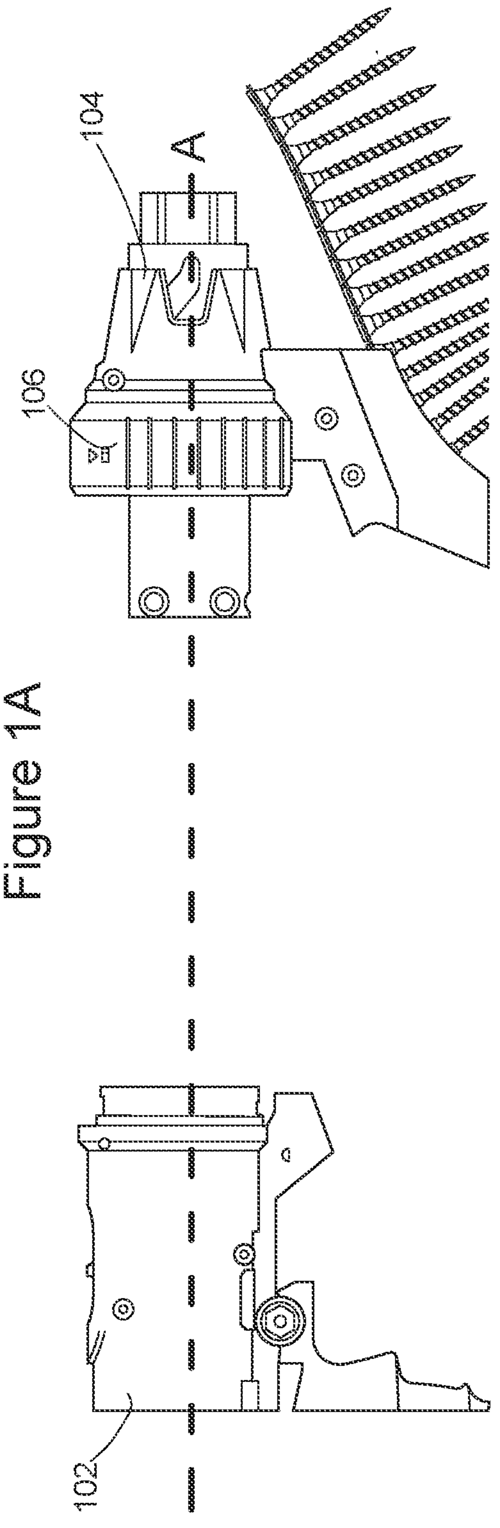
FIG. 1B shows a perspective view of the portion of the power tool in FIG. 1A with the first power tool portion detached from the second power tool portion.

FIGS. 1A and 1B show a perspective view of a portion of a power tool 100 with a first power tool portion 104 attached to and detached from a second power tool portion 102 respectively through a rotatable collar 106 along axis A. The connection end of the first power tool portion 104 has a corresponding structure for coupling with the connection end of the second power tool portion 102. The power tool 100 is a screw gun that requires an attachment to be coupled to the tool body. For illustration to aid understanding, the second power tool portion 102 is the tool body having a motor and connectable to batteries, and the first power tool portion 104 is an attachment for attaching to the tool body such that the tool is usable with strip of collated fasteners or screws.

Figure 2:
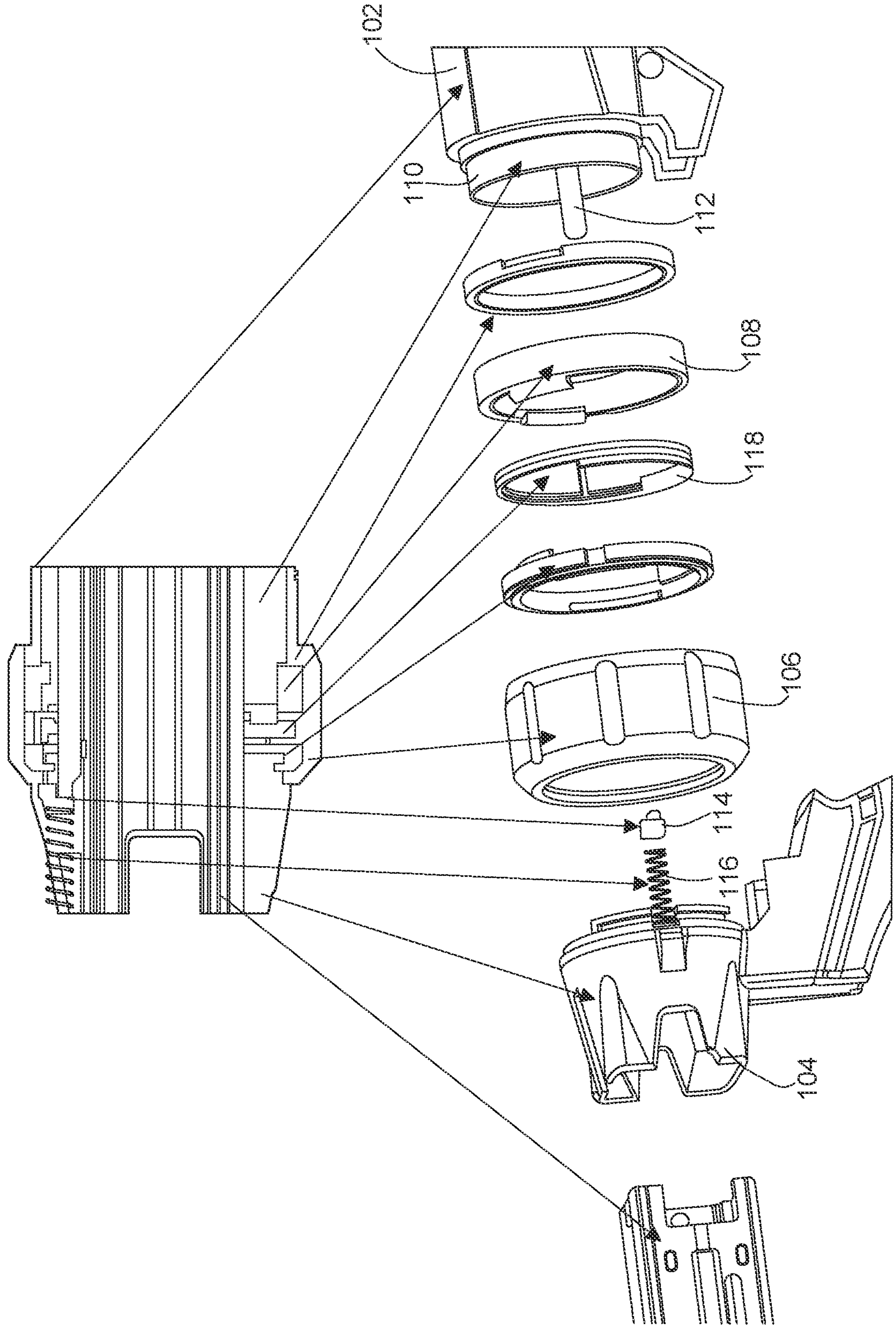
FIG. 2 shows a cross-sectional view of the portion of the power tool in FIG. 1A and an exploded view of its corresponding components.

Referring now to FIG. 2, there is shown a cross-sectional view of the portion of the power tool 100 and an exploded view of its corresponding components. The first power tool portion 104 includes the rotatable collar 106 and a first locking member 108 which can be actuated by the rotatable collar 106. The second power tool portion 102 includes a second locking member 110. The first locking member 108 and the second locking member 110 are generally annular and have substantially the same diameter of which is smaller the inner diameter of the rotatable collar 106. The rotatable collar 106 is rotatable about axis A (shown in FIGS. 1A and 1B) by a user for actuating the first locking member 108 in a rotational manner for removably engaging the first locking member 108 with the second locking member 110, and thereby releasably locking the first power tool portion 104 with the second power tool portion 102 along the axis.

The first power tool portion 104 further comprises a stop member 114 movably parallel to the axis A between an extended position and a retracted position, where at the extended position, the stop member 114 extends partly into the first locking member 108. The stop member 114 is slightly elongated. Moreover, a biasing member 116 is also provided to bias the stop member 114 to the extended position. In this embodiment, the biasing member 116 is a spring, with one end fixedly attached to one end of the stop member 114. The first power portion 104 further has a torsion spring 118, which is annular in shape. In this embodiment, the torsion spring 118 is connected with the rotatable collar 106 such that during attachment when the stop member 114 is being moved from the extended position to the retracted position, the rotatable collar 106 can be rotated under a force of the torsion spring 118. The second locking member 110 of the second power tool portion 102 comprises an axial projection 112 for moving the stop member 114 from the extended position to the retracted position during attachment as the first power tool portion 104 moves along axis A to couple with the second power tool portion 102.

Figure 3A:
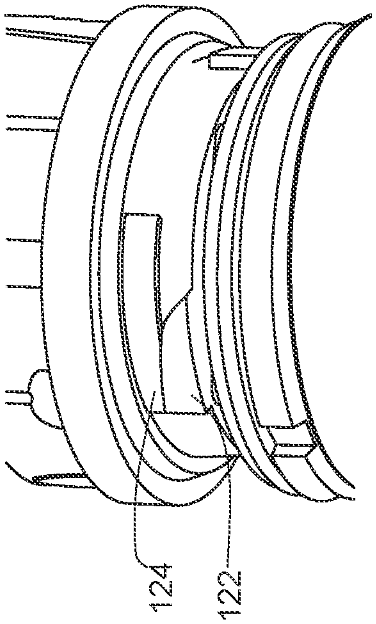
FIG. 3A shows a magnified perspective view of the connection between the first and second power tool portions in FIG. 1A with the rotatable collar removed, where detachment is prevented.
Figure 3B:
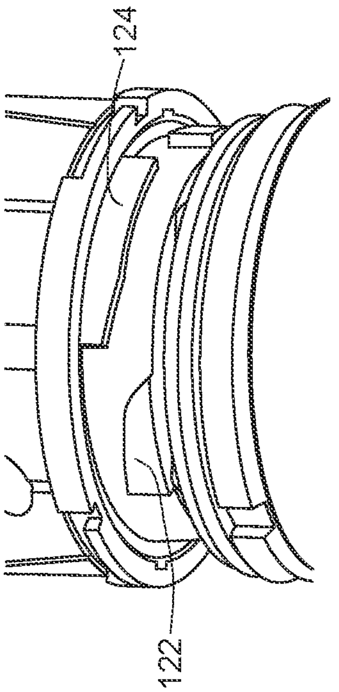
FIG. 3B shows a magnified perspective view of the connection between the first and second power tool portions in FIG. 1A with the rotatable collar removed, where detachment is allowed.

Referring to FIGS. 3A and 3B, which show a magnified perspective view of the connection between the first power tool portion 104 and the second power tool portion 102 with the rotatable collar 106 removed, where detachment is prevented and where detachment is allowed respectively. Note that under normal circumstance, the rotatable collar 106 is not arranged to be removed, and FIGS. 3A and 3B are shown with the rotatable collar 106 removed for illustration purpose only. Accordingly, when the first power tool portion 104 is locked with the second power tool portion 102, the first locking member 108 is arranged around the second locking member 110. The first locking member 108 is in contact with the inner surface of the rotatable collar 106 and the rotatable collar 106 is rotatable about axis A for rotating the first locking member 108 relative to the second locking member 110. The first locking member 108 and the rotatable collar 106 are connected for synchronous rotation.

Figure 3C:
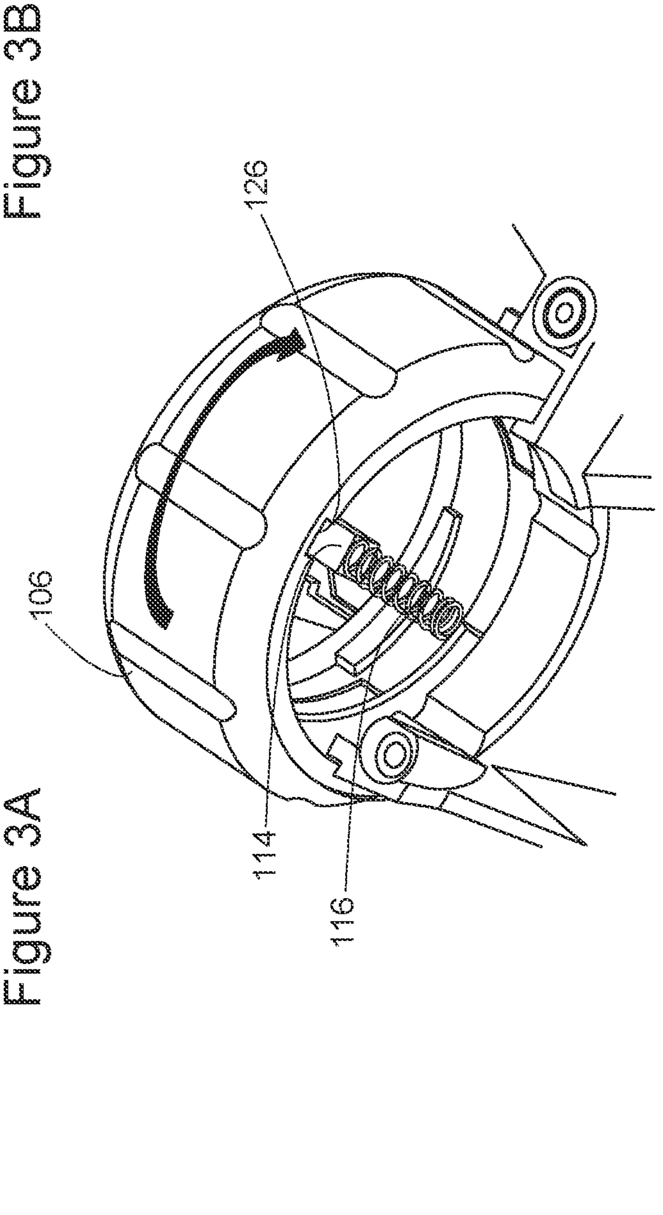
FIG. 3C shows a magnified perspective view of the rotatable collar in FIG. 1A with some components removed.

FIG. 3C shows a magnified perspective view of the rotatable collar 106 of the power tool 100. The rotatable collar 106 comprises a groove 126 on the inner surface. The groove 126 is elongated along the axial direction and has a radial width along the inner circumference of the collar 126 wide enough to fit in the stop member 114.

Now turning to the operation of the coupling mechanism, to remove the attachment from the screw gun body, the user simply needs to rotate the rotatable collar 106 in one direction, the stop member 114 would then be mated with the groove 126 and being urged to the extended position by the spring 116. At the extended position, the stop member 114 engages with the groove 126 of the rotatable collar 106 such that rotation of the first locking member 108 is obstructed. The limiting structures 122 and 124 of the first and second locking member 108 and 110 respectively are not engage or couple with each other, as shown in FIG. 3B.

To install the attachment to the screw gun body, the user needs to insert the axial projection 112 into the groove 126 of the rotatable collar 106 from the other side such that the stop member 114 would be urged backward in the groove 126. At the retracted position, the stop member 114 is not engaged with the groove 126 of the rotatable collar 106 and the first locking member 108 rotates under the force of the torsion spring 118 relative to the second locking member 110. The sides where the first and second locking member 108 and 110 touches each other include a slant surface as shown in FIG. 3B for restricting the degree of rotation with respect to each other, and as such forming a bayonet coupling between the two locking members 108, 110.

In FIGS. 4A to 6B, there is shown another embodiment of the invention in which a similar power tool 200 having a rotatable collar 206. The first power tool portion 204 includes the rotatable collar 206 and a first locking member 208 which can be actuated by the rotatable collar 206, and the second power tool portion 202 includes a second locking member 210. The rotatable collar 206 is rotatable about axis A for actuating the first locking member 208 to removably engage the first locking member 208 with the second locking member 210, thereby releasably locking the two members along axis A. The first locking member 208 and the second locking member 210 are arranged to form an interference fit to lock the first power tool portion 204 with the second power tool portion 202.

Figure 4A:
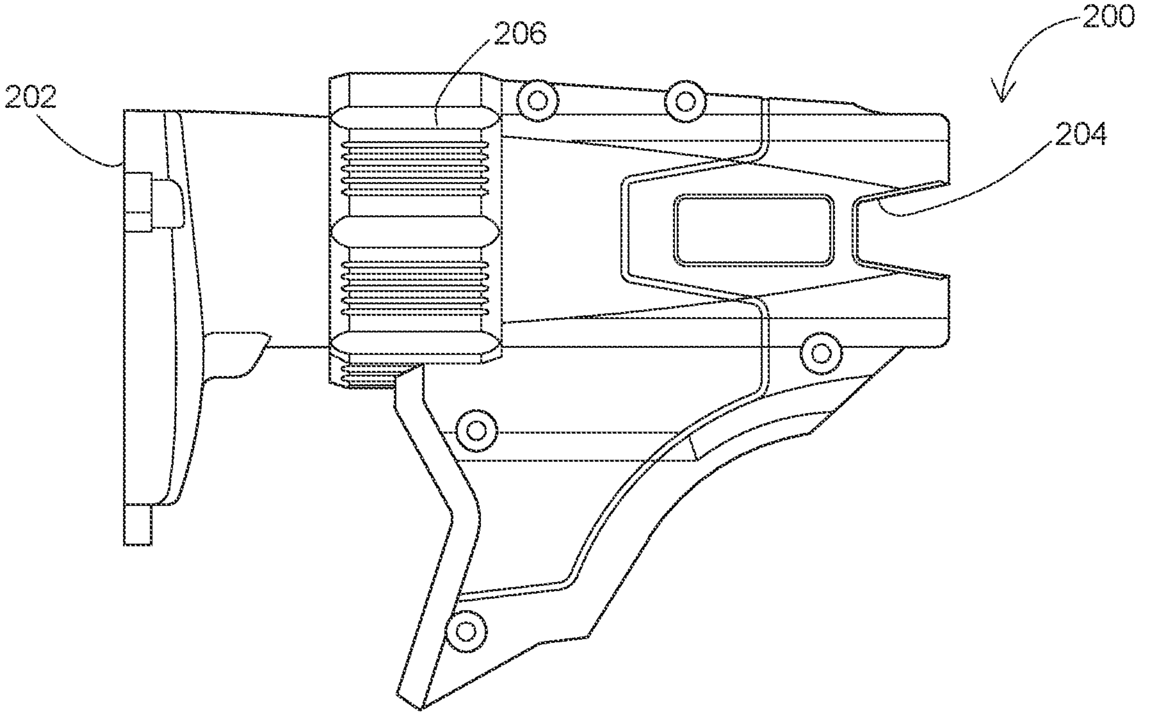
FIG. 4A shows a perspective view of a portion of a power tool with a first power tool portion attached to a second power tool portion through a rotatable collar according to a second embodiment of the invention.
Figure 4B:
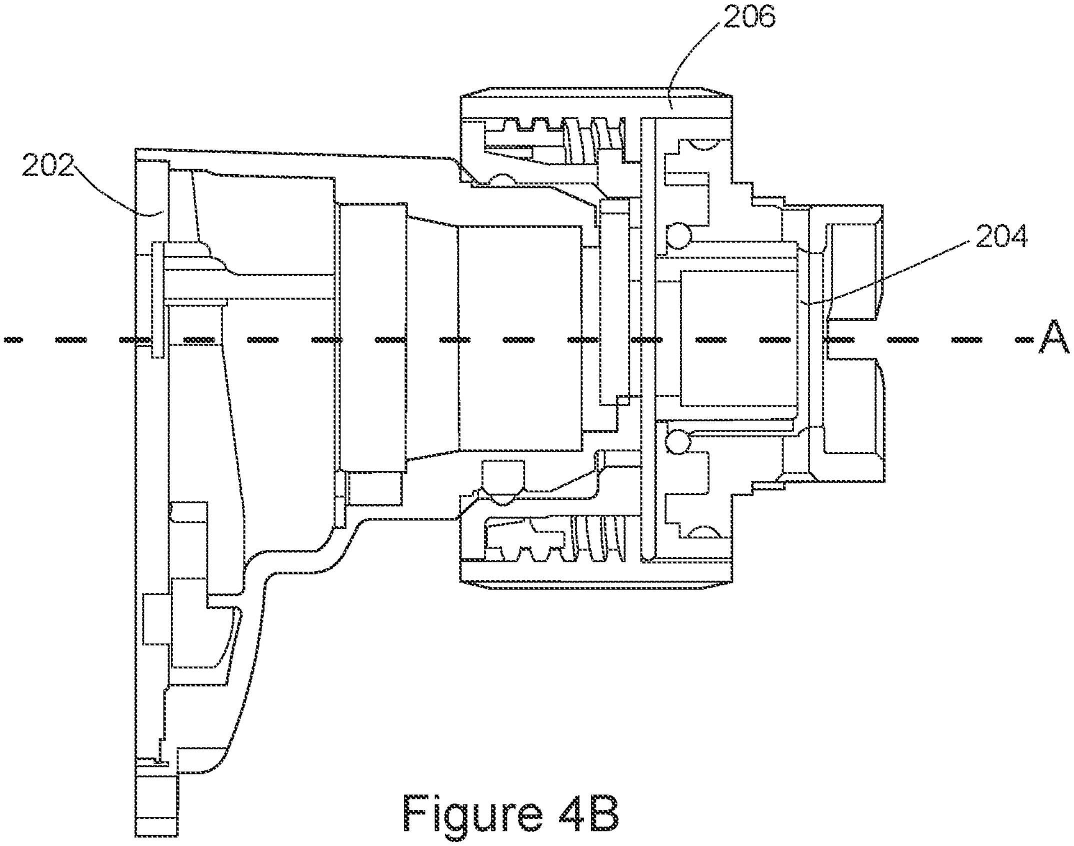
FIG. 4B shows a cross-sectional view of the portion of the power tool in FIG. 4A.
Figure 5:
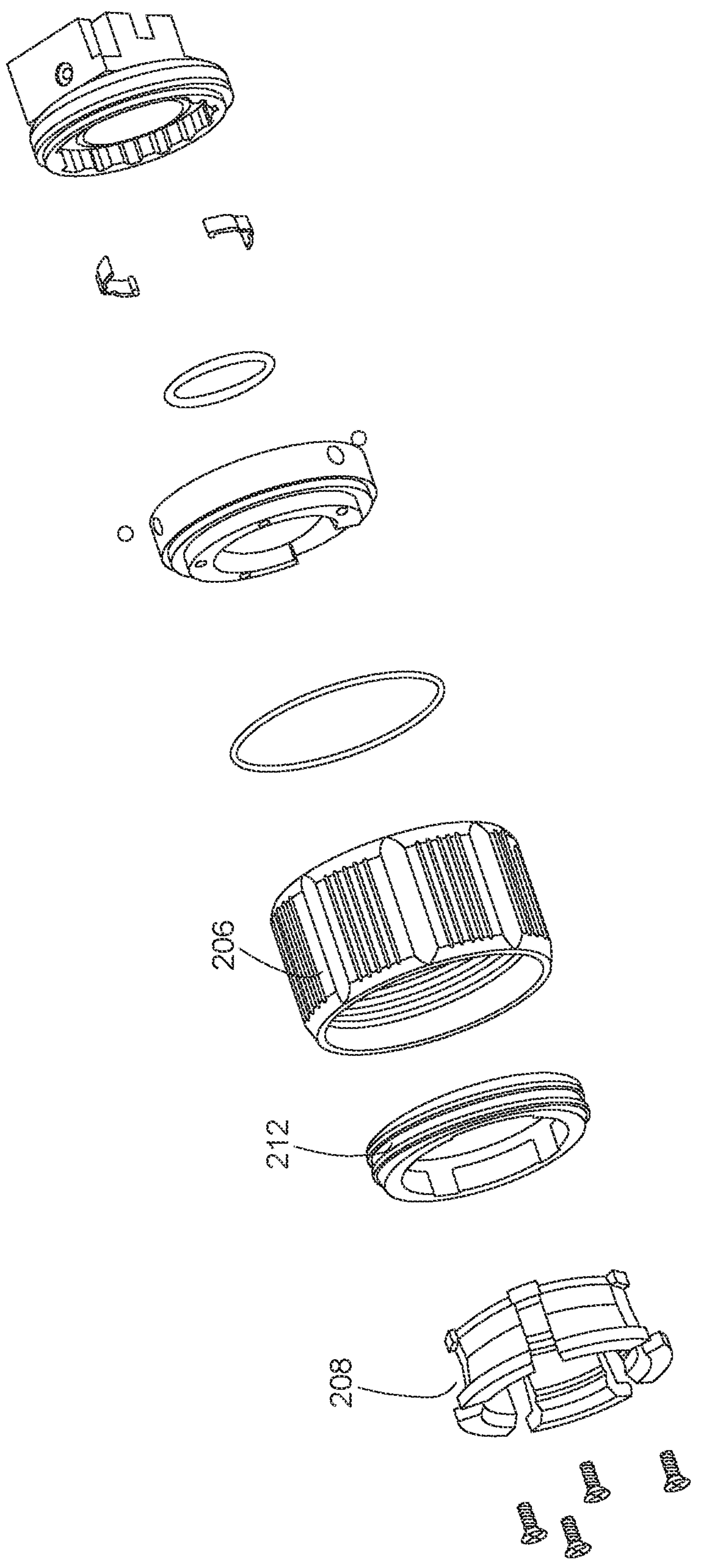
FIG. 5 shows an exploded view of the portion of the power tool in FIG. 4A.

FIG. 4B shows a cross-sectional view of the portion of the power tool 200 and FIG. 5 shows an exploded view of FIG. 4A. In this embodiment, the first locking member 208 is a reversibly, radially-movable portion movable between a first radial position further away from axis A and a second radial position closer to axis A for engagement with the second locking member 210. The reversibly, radially-movable portion 208 is annular and includes some gaps along the radial circumference on one end to facilitate the movement between the first and second radial positions. The radially-movable portion can be made of plastic, and is arranged inside of the rotatable collar 206. Additionally, the reversibly, radially-movable portion includes a ramp surface such that one side along the axial direction is closer to the inner surface of the collar 206 and the other side is further away from the inner surface of the collar 206. The inner surface of the rotatable collar 206 is threaded.

The first power tool portion 204 further includes an intermediate member 212. The intermediate member 212 has a threaded outer surface, and the threaded outer surface is arranged to threadedly engage with the inner surface of the rotatable collar 206. When the rotatable collar 206 is being rotated, the intermediate member 212 would be rotated relative to the collar 206 and move along the axis A between the collar 206 and the reversibly, radially-movable portion.

Figure 6B:
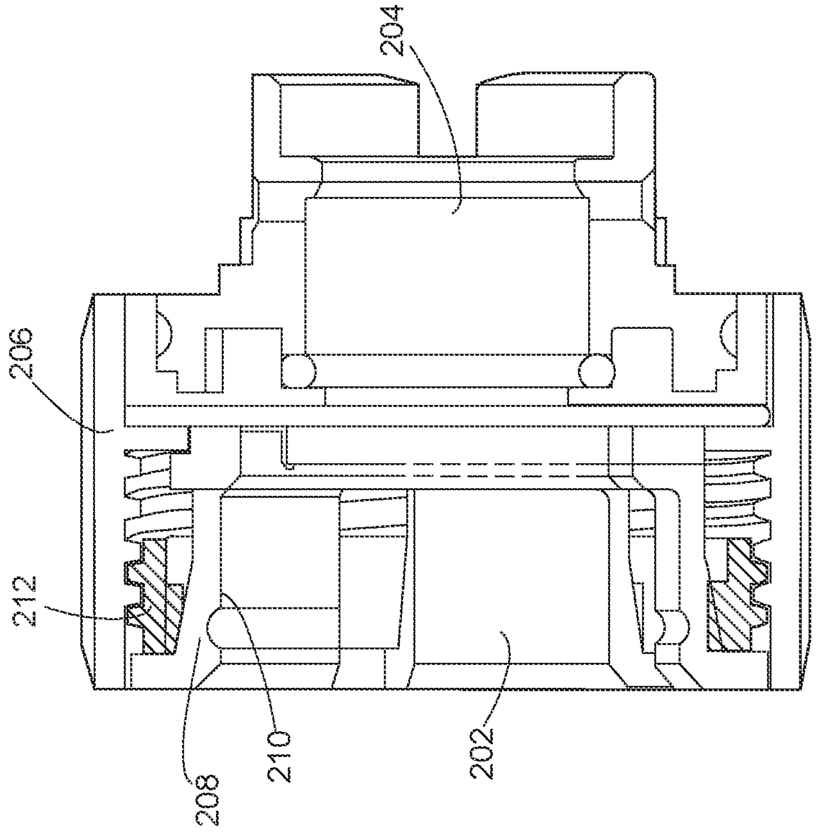
FIG. 6B shows a magnified cross-sectional view of the connection between the first and second power tool portions in FIG. 4A with the intermediate member at the locked position.
Figure 6A:
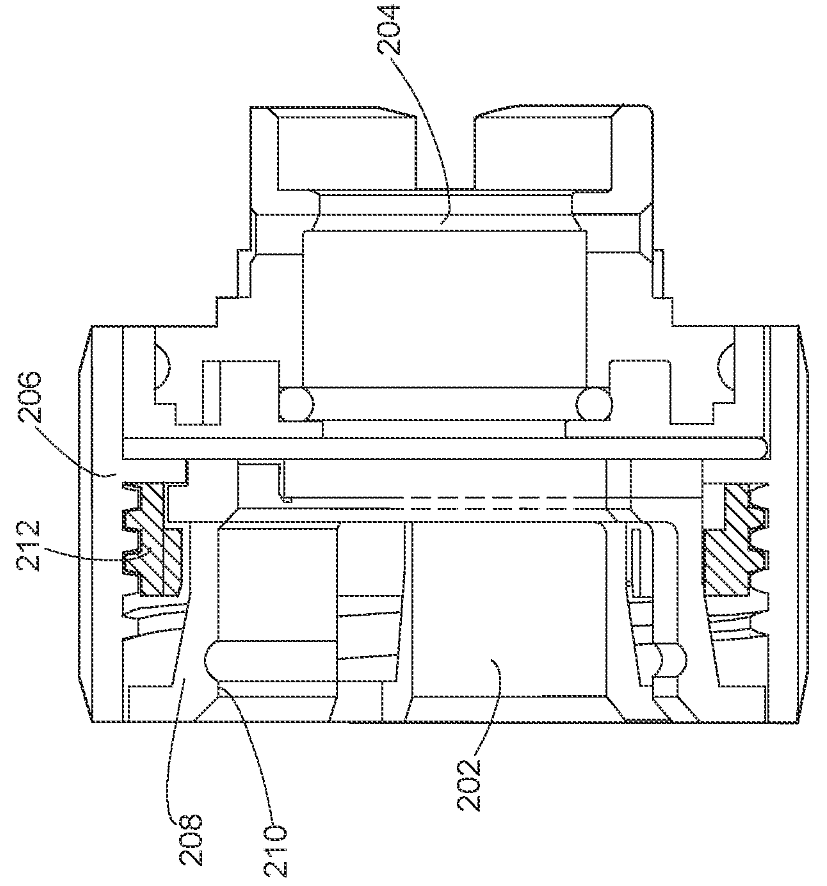
FIG. 6A shows a magnified cross-sectional view of the connection between the first and second power tool portions in FIG. 4A with the intermediate member at the unlocked position.
Figure 7:
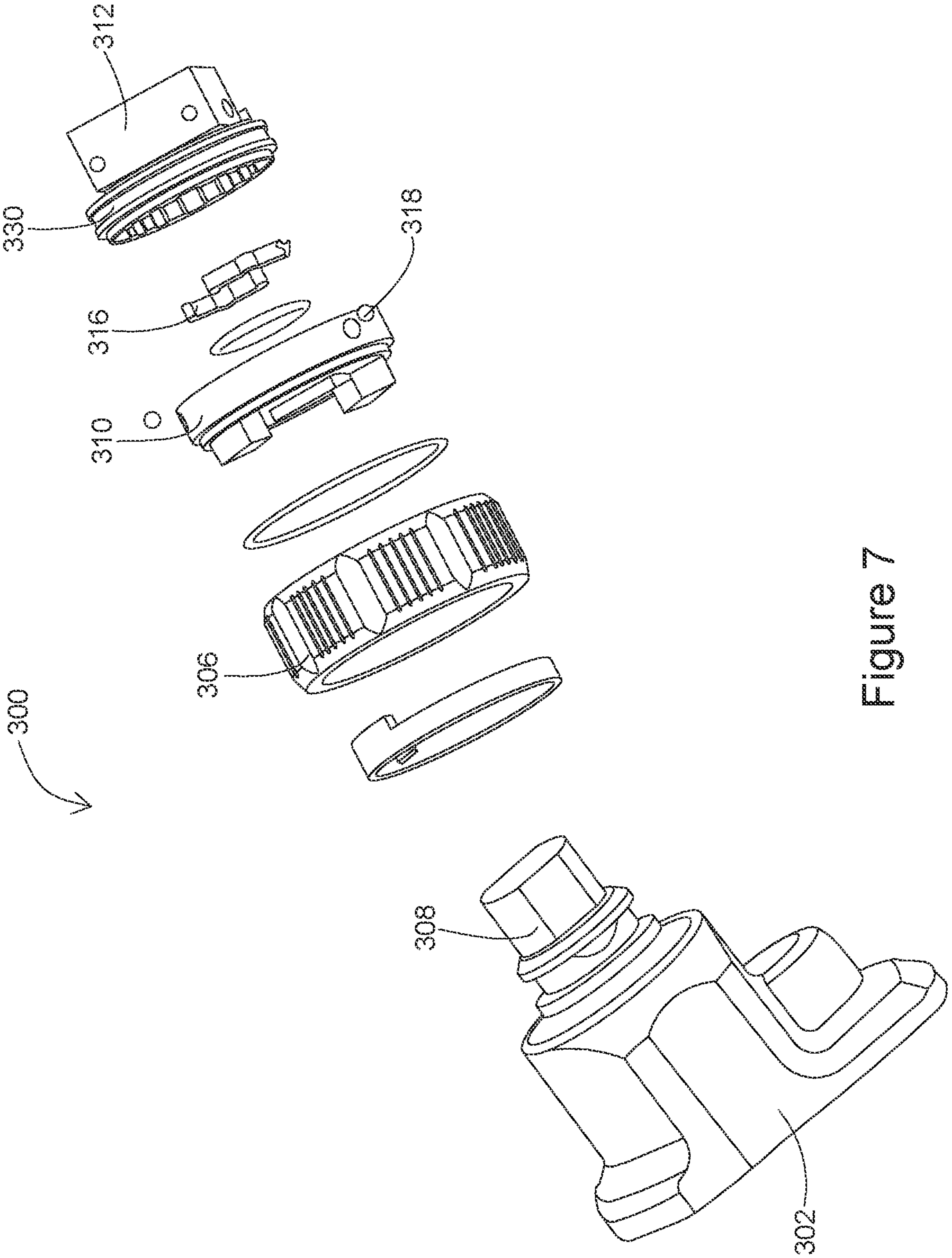
FIG. 7 shows an exploded view of a portion of a power tool according to a third embodiment of the invention.

Referring now to FIGS. 6A and 6B, there is shown a magnified cross-sectional view of the connection between the first power tool portion 204 and the second power tool portion 202 with the intermediate member 212 at the unlocked position and at the locked position respectively. The rotatable collar 206 is rotatable about axis A to move the intermediate member 212 along the axis on the ramp surface of the reversibly, radially-movable portion 208 between the unlocked position and the locked position.

To illustrate, to install an attachment to the screw gun body, the user rotates the rotatable collar 206 in one direction. The rotational movement of the collar 206 drives the intermediate member 212 to move towards a locked position through the threaded surfaces (as shown the FIG. 6B). At this locked position, the intermediate member 212 urges a part of the reversibly, radially movable portion 208 to move radially to the second radial positon, which is being radially-compressed towards the axis such that it engages with the second locking member 210 if the second locking member 210 is inserted.

To remove the attachment to the screw gun body the user rotates the rotatable collar 206 in the other direction. The opposite rotational movement of the collar 206 drives the intermediate member 212 to move towards an unlocked position through the threaded surfaces (as shown the FIG. 6A). At this unlocked position, the radially-movable portion returns to its relax form at the first radial position, which is further away from axis A and which is not engage with the second locking member 210 such that the attachment can be detached from the screw gun body.

In FIGS. 7 to 9B, there is shown another embodiment of the invention in which a similar power tool 300 having a rotatable collar 306 and only the major differences will be described here. The second power tool portion 302 has a second locking member 308 having an elongated structure, and the first power tool 304 has a first locking member which is an opening of complementary shape. Upon rotating one to another, the two power tool portions 302, 304 are locked at different relative angular positions between each other along the direction of axis A.

Figure 8B:
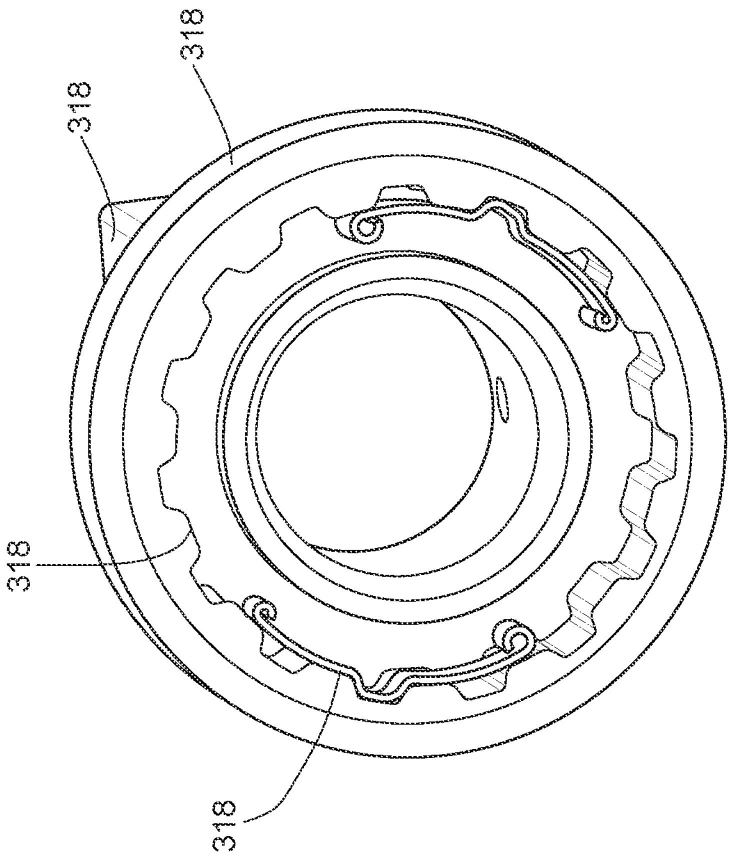
FIG. 8B shows a magnified perspective view of the second coupling part in FIG. 7.
Figure 8A:
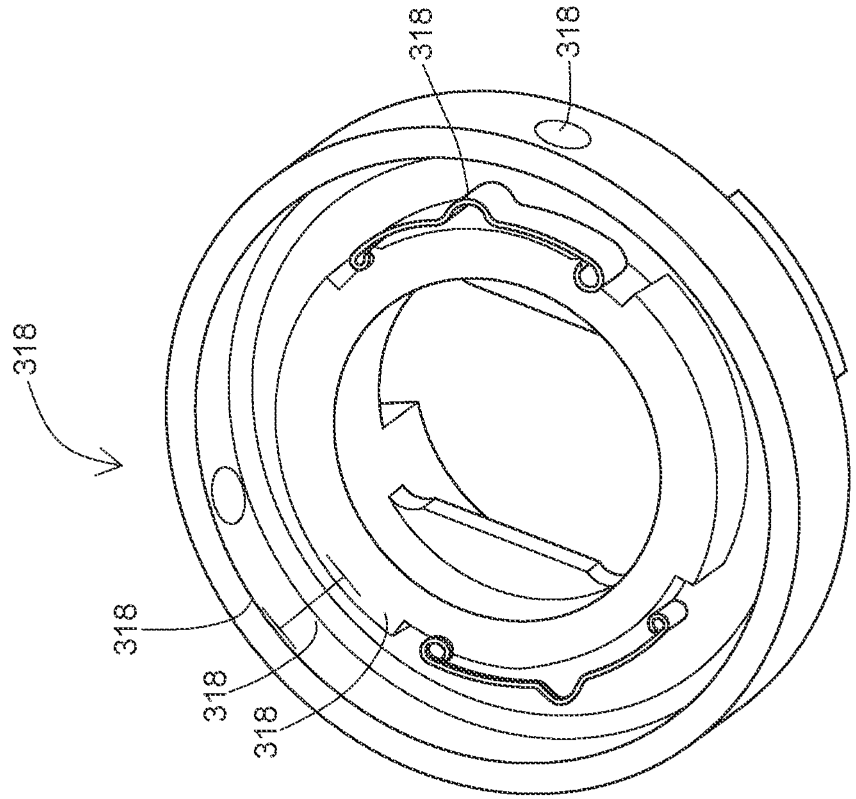
FIG. 8A shows a magnified perspective view of the first coupling part in FIG. 7.

Referring now to FIGS. 8A and 8B, which show a magnified perspective view of the first coupling part 310 and second coupling part 312 respectively. The first power tool portion 304 comprises the first coupling part 310 and the second coupling part 312 rotatably coupled with each other, for rotating relative to each other about axis A. The first power tool portion 304 further comprises one or more biasing members 316. In this example, there are two diametrically opposed biasing members 316. The biasing members 316 are leaf springs, which are arranged to bias radially outwardly with respect to axis A and are placed between the first coupling part 310 and the second coupling part 312 for limiting the relative orientation between them. In this embodiment, the two diametrically opposed biasing members 316 are rotationally fixed to the first coupling part 310.

Specifically, each of the biasing members 316 comprises circumferentially-extending leg portions and, in between, a projection-ramp portion that projects radially outwardly. The first coupling part 310 comprises an inner circumferential wall 322 and an outer circumferential wall 320, and a circumferential space 324 is defined as the space between the inner circumferential wall 322 and outer circumferential wall 320. The second coupling part 312 has a circumferential projection 314 which is at least partly received in the circumferential space 324 such that the first coupling part 310 partly surrounds the second coupling part 312. The biasing members 316 are arranged radially between the inner circumferential wall 322 of the first coupling part 310 and the circumferential projection 314 of the second coupling part 312.

The circumferential projection 314 of the second coupling part 312 includes a radially-inner-circumferential face directly facing the inner circumferential wall 322 of the first coupling part 310. The radially-inner-circumferential face includes a plurality of angularly-spaced radial-grooves for receiving the projection-ramp portion of the biasing member 316. The projection-ramp portion of the biasing member 316 is arranged to slide-and-move-along the angularly-spaced radial-grooves when the first coupling part 310 rotates relative to the second coupling part 312.

Figure 9B:
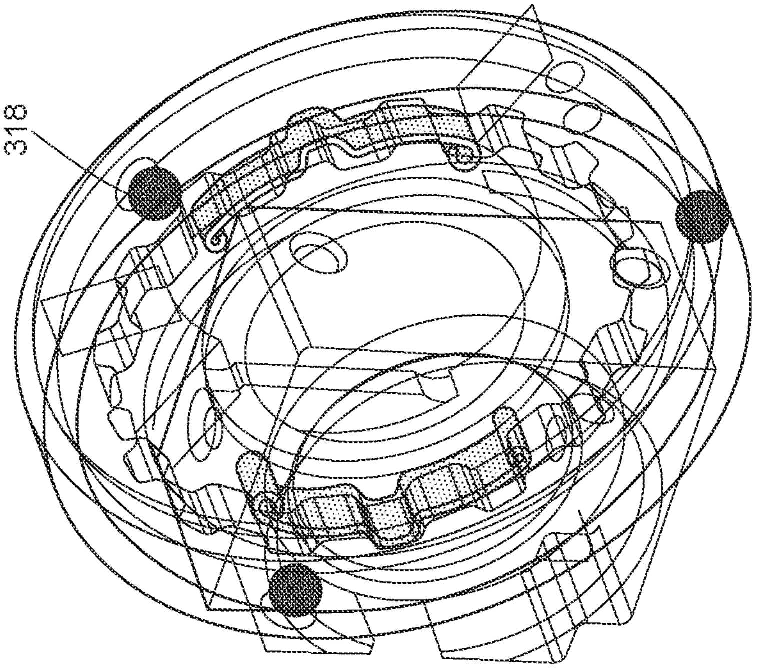
FIG. 9B shows a magnified perspective view of the coupling between the first and second coupling parts in FIG. 7.
Figure 9A:
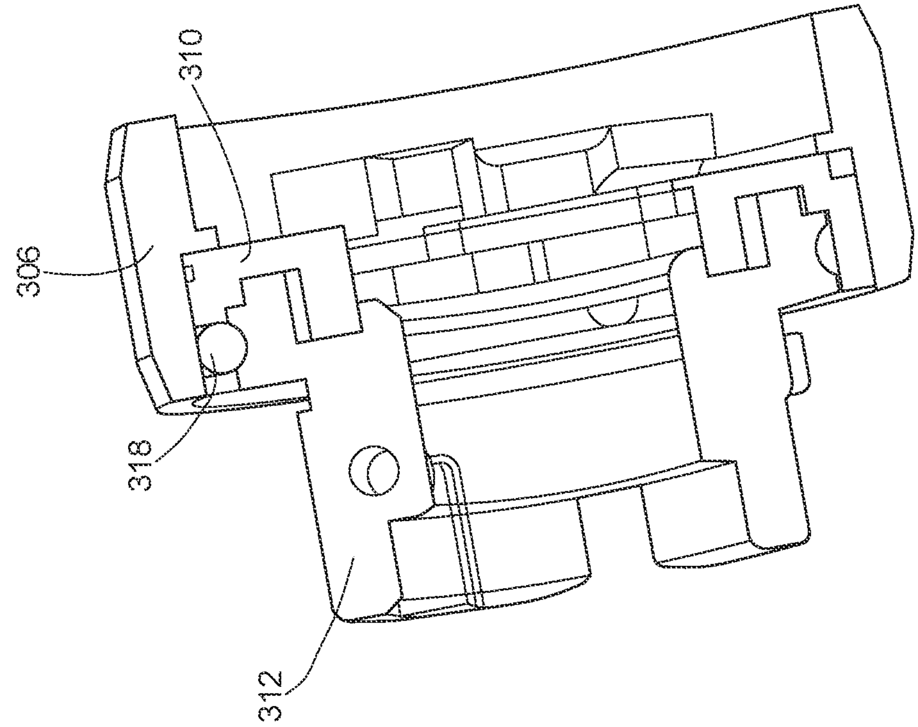
FIG. 9A shows a magnified cross-sectional view of the coupling between the first and second coupling parts in FIG. 7.

FIGS. 9A and 9B show respectively a magnified cross-sectional view and a perspective view of the coupling between the first coupling part 310 and the second coupling part 312. The power tool 300 further includes an axial-locking mechanism for axially locking the first coupling part 310 with the second coupling part 312. The circumferential projection 314 of the second coupling part 312 has a radially-outer-circumferential face, and a groove 330 is formed entirely around the radially-outer-circumferential face. Additionally, there are one or more radial openings 332 formed on the outer circumferential wall of the first coupling part 310, and one of more locking members 318 received in between the groove 330 and the radial opening 332. In this example there are three openings 332 and three corresponding locking members 318. Each of the locking members 318 is a spherical roller having a diameter smaller than that of the radial opening 332 such that it remains confined in the circumferential space 324.

The axial-locking mechanism described allows the user to rotate the attachment relative to the screw gun body without having to remove the attachment and install it again to the screw gun body at a different angle. The leaf spring holds the relative orientation between the first and the second coupling parts 310, 312, until the user rotates the attachment, the leaf spring is temporarily being urged downwards by the circumferential projection 314 such that the second coupling part 312 rotates relative to the first coupling part 310. The rotatable collar 306 is non-rotatably coupled with and arranged around the radially-outer-circumferential face of the first coupling part 310, such that when the user rotates the rotatable collar 306, the first power tool portion 304 can rotate relative to the second power tool portion 302.

While the invention has been illustrated and described in detail in the drawings and foregoing description, the same is to be considered as illustrative and not restrictive in character, it being understood that only exemplary embodiments have been shown and described and do not limit the scope of the invention in any manner. It can be appreciated that any of the features described herein may be used with any embodiment. The illustrative embodiments are not exclusive of each other or of other embodiments not recited herein. Accordingly, the invention also provides embodiments that comprise combinations of one or more of the illustrative embodiments described above. Modifications and variations of the invention as herein set forth can be made without departing from the spirit and scope thereof, and, therefore, only such limitations should be imposed as are indicated by the appended claims.

Although not shown in the figures, but in other embodiments, the power tool 100, 200, 300 may be another type of tools or devices that requires an attachment to be coupled to the tool body. In some embodiments, the power tool can be a drill, hammer drill, or an impact driver. In the examples illustrated, the second power tool portion is the tool body, and the first power tool portion is an attachment arranged to attach to the tool body. However, the first power tool portion can be the tool body, and the second power tool portion can be the attachment to be attached to the tool body. Similarly, the rotatable collar can be on the second power tool portion, instead of the first power tool portion. The quantities of components in the above embodiments are merely example, and can be more or less according to design needs. For example, instead of two leaf springs in FIGS. 7-8B, there may be one or four leaf springs. Likewise, they may be two or four rollers and radial openings.

Terms such as "forward", "rearward", "in front of", "behind", "highest", "lowest", "left", "right" and similar terms as used herein are for the purpose of describing the invention in its normal in-use orientation and are not intended to limit the invention to any particular orientation.

Any reference to prior art contained herein is not to be taken as an admission that the information is common general knowledge, unless otherwise indicated.

The invention claimed is:

1. A power tool, comprising:

a first power tool portion having a rotatable collar and a first locking member arranged to be actuated by the rotatable collar;

a second power tool portion having a second locking member;

wherein the rotatable collar is rotatable about an axis for actuating the first locking member to removably engage the first locking member with the second locking member, thereby releasably locking the first power tool portion with the second power tool portion along the axis;

wherein the first power tool portion further comprises:

- a groove on an inner surface of the rotatable collar;
- a stop member movable parallel to the axis between an extended position and a retracted position; and
- a biasing member biasing the stop member to the extended position;

wherein at the extended position, the stop member is engaged with the groove of the rotatable collar such that rotation of the first locking member is obstructed; and wherein at the retracted position, the stop member is not engaged with the groove of the rotatable collar such that rotation of the first locking member is unobstructed.

2. The power tool of claim 1, wherein the second locking member comprises an axial projection for moving the stop member from the extended position to the retracted position as the first power tool portion is moved along the axis to couple with the second power tool portion.

3. The power tool of claim 1, wherein the first power tool portion further comprises a torsion spring connected with the rotatable collar such that upon the stop member is being moved from the extended position to the retracted position, the rotatable collar is being rotated under a force of the torsion spring.

4. The power tool of claim 1, wherein the stop member extends at least partly into the first locking member at the extended position.

5. The power tool of claim 1, wherein the first locking member is arranged around the second locking member when the first power tool portion locks with the second power tool portion.

6. The power tool of claim 1, wherein the first locking member and the second locking member are arranged to form a bayonet coupling.

7. The power tool of claim 1, wherein the rotatable collar has an inner surface and an outer surface, and the first locking member is in contact with the inner surface.

8. The power tool of claim 1, wherein the first locking member is rotatable; and the rotatable collar is rotatable about the axis for rotating the first locking member.

9. The power tool of claim 1, wherein the first locking member and the rotatable collar are connected for synchronous rotation.

10. The power tool of claim 1, wherein the first locking member and the second locking member are generally annular.

11. A power tool, comprising:

a first power tool portion having a rotatable collar and a first locking member arranged to be actuated by the rotatable collar; and a second power tool portion having a second locking member;

wherein the rotatable collar is rotatable about an axis for actuating the first locking member to removably engage the first locking member with the second locking member, thereby releasably locking the first power tool portion with the second power tool portion along the axis; and wherein the first locking member and the second locking member are arranged to form an interference fit when the first power tool portion is locked with the second power tool portion along the axis.

12. The power tool of claim 11, wherein the first locking member comprises a reversibly, radially-movable portion movable between a first radial position further away from the axis and a second radial position closer to the axis for engagement with the second locking member.

13. The power tool of claim 12, wherein the reversibly, radially-movable portion is arranged inside of the rotatable collar.

14. The power tool of claim 12, wherein the rotatable collar has an inner surface and an outer surface, wherein the inner surface is threaded.

15. The power tool of claim 14, wherein the reversibly, radially-movable portion includes a ramp surface along the axial direction such that one side is closer to the inner surface of the rotatable collar and the other side is further away from the inner surface of the rotatable collar.

16. The power tool of claim 15, wherein the first power tool portion further includes an intermediate member having a threaded outer surface, wherein the threaded outer surface is arranged to threadedly engage with the inner surface of the rotatable collar.

17. The power tool of claim 16, wherein the intermediate member is movable along the axis on the ramp surface between an unlocked position in which the radially-movable portion is at the first radial position and a locked position in which the radially-movable portion is radially-compressed at the second radial positon.

18. The power tool of claim 16, wherein the rotatable collar is rotatable about the axis for moving the intermediate member between the unlocked position and the locked position.

* * * * *